US012036690B2

(12) United States Patent
Penazzi et al.

(10) Patent No.: US 12,036,690 B2
(45) Date of Patent: Jul. 16, 2024

(54) CUTTING APPARATUS

(71) Applicant: SACMI COOPERATIVA MECCANICI IMOLA SOCIETA' COOPERATIVA, Imola (IT)

(72) Inventors: Davide Penazzi, Imola (IT); Matteo Venturini, Imola (IT)

(73) Assignee: SACMI COOPERATIVA MECCANICI IMOLA (IT)

(*) Notice: Subject to any disclaimer, the term of this patent is extended or adjusted under 35 U.S.C. 154(b) by 115 days.

(21) Appl. No.: 17/369,206

(22) Filed: Jul. 7, 2021

(65) Prior Publication Data

US 2022/0009119 A1 Jan. 13, 2022

(30) Foreign Application Priority Data

Jul. 8, 2020 (IT) ........................ 102020000016570

(51) Int. Cl.
*B26F 1/18* (2006.01)
*B26D 3/08* (2006.01)

(52) U.S. Cl.
CPC .................. *B26F 1/18* (2013.01); *B26D 3/08* (2013.01); *B26F 2210/04* (2013.01)

(58) Field of Classification Search
CPC .......... B26F 1/18; B26F 2210/04; B26D 3/08; B26D 1/38; B26D 9/00; B26D 1/02; B26D 7/06
USPC ........................................................... 83/731
See application file for complete search history.

(56) References Cited

U.S. PATENT DOCUMENTS 5,758,476 A * 6/1998 Van Den Akker ........ B67B 3/06 53/485
10,981,766 B2 * 4/2021 Scott ..................... B67B 3/2066
2014/0311089 A1 * 10/2014 Scott ..................... B67B 3/2066 53/331.5
2016/0354946 A1 * 12/2016 Sain ......................... B26D 7/06

FOREIGN PATENT DOCUMENTS

EP 0775667 A1 * 5/1997
JP 63165034 A * 8/1988
WO 9917911 A1 4/1999
WO 2014207582 A2 12/2014
WO WO-2018033826 A1 * 2/2018 ........... B67B 3/2066

OTHER PUBLICATIONS

Translation of JP 63165034 (Year: 2023).*

* cited by examiner

*Primary Examiner* — Nhat Chieu Q Do
(74) *Attorney, Agent, or Firm* — Laubscher & Fretwell, P.C.

(57) ABSTRACT

A cutting apparatus is provided for cutting a cap as it travels along an advancement path in an advancement direction. The cutting apparatus includes a spindle movable along the advancement path and rotatable around an axis thereof. The spindle is shaped to interact with the cap and to rotate the cap around the axis. A support moves along the advancement path together with the spindle. The support is shaped to interact with the cap and to retain the cap against the spindle. A cutting device is arranged to form a cut in a side wall of the cap when the spindle reaches a cutting zone provided in the advancement path. The spindle includes a hollow housing shaped to house a cap protrusion to stop rotation of the cap in a preset position with respect to the spindle to orient the cap with respect to the cutting device.

21 Claims, 8 Drawing Sheets

CUTTING APPARATUS

This application claims priority of IT 102020000016570 filed Jul. 8, 2020.

TECHNICAL FIELD

The invention relates to a cutting apparatus for cutting caps or plugs, for example made of plastics, of the type used for closing containers such as, for example, bottles. In particular, the invention relates to an apparatus for making incisions on a side wall of the caps. The incisions made can cause in the body of the cap a tamper ring, or connecting portions between the tamper ring and side wall of the cap, like for example straps or bands or hinges or define other cap portions.

BACKGROUND OF THE INVENTION

Known cutting apparatuses, typically, have a carousel structure, including spindles and a gripping arrangement for gripping the caps, the spindles and the gripping arrangement being fitted to the periphery of the carousel and are spaced apart from one another and are rotatable on themselves. Each spindle is configured to engage in a cap to rotate the cap on itself and convey the cap along a circular advancement path through one or more zones in which cutting devices are arranged, that make an incision in or cut the side wall of the cap.

Cutting devices are known that include knives that are suitable for cutting or making an incision in the side wall of a cap to obtain a circumferential weakening line in order to form a tamper band or horizontal openings on the side wall. The type of cut made by such devices is also known by the name of horizontal cut.

Cutting devices are further known that are suitable for cutting or making incisions, in one or more points or zones, a side wall of a cap in determined radial positions according to a direction that is substantially parallel to the axis of the cap, in order to obtain weakening zones in the tamper band or to define connecting portions between the tamper band and the remaining part of the side wall of the cap, such as straps or hinges. The type of cut made by such devices is also known by the name of vertical cut.

Cutting apparatuses are known that include cutting devices that is suitable both for making a circumferential incision and for making a vertical incision on the side wall of the cap in set radial positions of the cap. These latter cutting devices generally include an element for horizontal cutting downstream of which an element is positioned that is provided with a vertical blade to make an incision on the cap by a vertical cut.

One drawback of prior art cutting apparatuses is sliding between the spindle and the cap especially during contact with the cutting devices. This sliding causes a loss of synchronization between the cap and the components of the cutting apparatus. This may mean that the incisions are made on the caps in spatial positions that are other than those intended, making the end product lose functionality.

In order to overcome the aforesaid drawback, in the prior art gripping arrangement is provided that is fitted to the spindles including radially movable elements that are shaped so as to retain the cap from the inside of the cap the gripping arrangement pressing radially against several inner points of the side wall.

Nevertheless, the gripping arrangement consists of a plurality of components that make these cutting apparatuses complex.

Further, the inner wall of the cap has to be shaped so that it has surfaces against which the aforesaid gripping arrangement can interact to retain the cap. This causes a certain structural complication of the cap that make the costs of producing the cap higher, particularly when the cap also has a non-axisymmetric outer shape, as for example if it is desired to produce a cap with a tab or grip portion or engagement portion with the fingers—also known as a peak or beret in Italian—and/or with raised outer hinges on the periphery of the cap, as in the case of a snap cap. In fact, the costs of designing the apparatuses for producing caps increase if in addition to a non-regular outer shape also complex inner structures of the body of the cap have to be provided.

SUMMARY OF THE INVENTION

One object of the invention is to improve known cutting apparatuses.

A further object of the invention is to provide an apparatus for making cuts that is able to solve the limits and drawbacks of the prior art.

A further object of the invention is to provide a cutting apparatus to make an incision in the caps in which a correct position of the cuts on the caps is ensured, in particular of the vertical cuts.

Still another object is to provide a cutting apparatus for making incisions on non-axisymmetrical caps or caps with non-regular outer profiles, in particular caps provided with tabs or gripping portion and/or having an outer hinge, like for example snap caps.

Such objects are achieved by the cutting apparatus according to one or more of the claims set out below.

The apparatus in question can include a spindle that is suitable for housing in a hollow housing thereof an element that projects outside the body of the cap.

The apparatus in question can include a cutting device built into the spindle that rotates together with the cap and makes an incision on the cap when the cap is at preset points on the advancement path inside the cutting apparatus.

Owing to the invention, it is possible to obtain a cutting apparatus for making incisions in caps that permits precise orientation of the cap with respect to a blade, in particular a vertical cut blade.

Owing to the invention, it is possible to obtain a cutting apparatus for making incisions in non-axisymmetrical caps externally that limits or even eliminates the sliding between the cap and the spindle of the cutting apparatus.

The apparatus according to the invention enables an incision to be obtained on a cap that is provided with a protrusion, such as for example a tab or a gripping portion or a hinge that is raised with respect to the side wall, in particular on a cap of snap type.

Owing to the invention, it is possible to reduce the rejects in the production of caps provided with notches.

BRIEF DESCRIPTION OF THE DRAWINGS

The invention can be better understood and implemented with reference to the attached drawings that illustrate some embodiments thereof by way of non-limiting examples, in which.

DETAILED DESCRIPTION

In FIGS. 1 to 7, a cutting apparatus 1 is disclosed that is arranged for cutting or making incisions on plugs or caps 10. The caps 10 are usable for closing containers, for example bottles.

Figure 9:
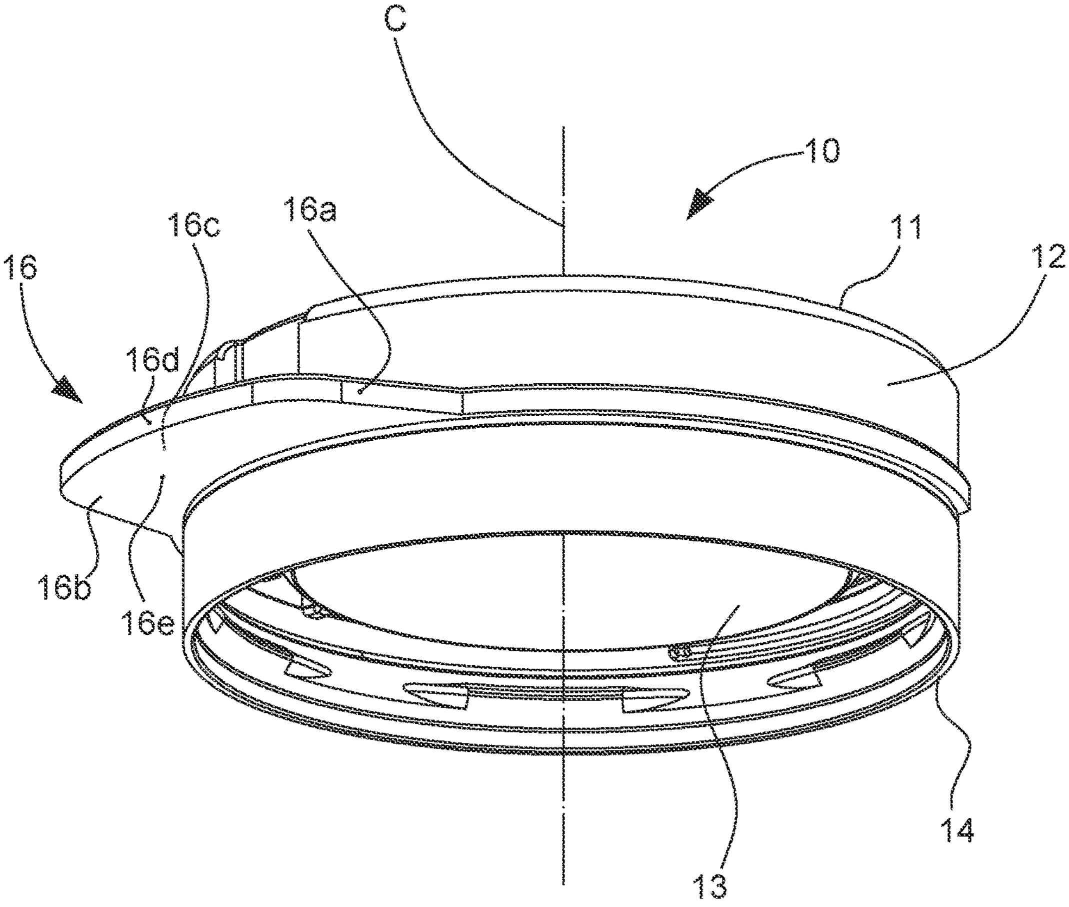
FIG. 9 is a perspective view of a snap cap that is suitable for being housed in the spindle of FIG. 4.

With reference to FIG. 9, each cap 10, made for example of plastics, has a cup shape and includes:

- a base wall or upper wall 11 of substantially circular shape;
- a side wall 12, for example a substantially cylindrical wall, that extends from the perimeter of the upper wall 11, along a direction that is parallel to a main axis C of the cap 10, as far as a free edge 14 thereof;
- a protrusion 16, that extends from the side wall 12 to the outside of the body of the cap 10, known afterwards as the "outer protrusion 16" to distinguish the outer protrusion 16 from the elements of the body of the cap that may be possibly present and protruding internally thereinto, like for example a tightening thread or a seal ring. The protrusion 16 causes the cap 10 to be non-axisymmetric.

Figure 9A:
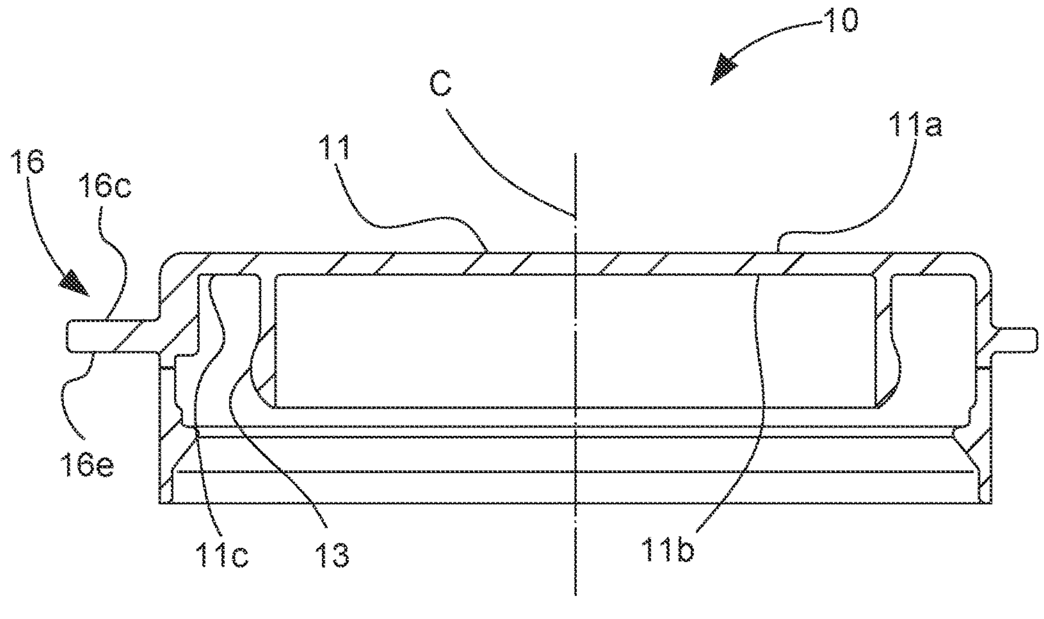
FIG. 9A is an axial section of the snap cap of FIG. 9.

In the cap embodiment of FIGS. 9 and 9A, the cap 10 is of the snap type and the outer protrusion 16 is a tab or gripping portion or engaging portion for the fingers—also known as a "visor" or "peak" in Italian—arranged for being gripped and pushed upwards by the fingers of a user during opening of the container to which the cap 10 has been applied.

The outer protrusion 16 can be a plate, i.e. be substantially flat, for example with a plan shape that is reminiscent of a crescent. In particular, the outer protrusion 16 extends in a substantially radial direction, i.e. substantially orthogonal to the main axis C of the cap 10 and for a certain circumference portion of the side wall 12 of the cap 10 at an intermediate height between the height of the upper wall 11 and the free edge 14 of the side wall 12.

The outer protrusion 16 includes a plurality of faces that, during the cutting operations inside the cutting apparatus 1, are in contact with or surrounded by abutting and containing surfaces of a spindle of the cutting apparatus; the abutting and containing surfaces enable the cap to be maintained in a preset radial position with respect to the spindle, as will be disclosed below.

In the embodiment of FIG. 9, the outer protrusion 16 includes a first lateral face 16*a* and a second lateral face 16*b* opposite one another that extend substantially parallel to the main axis C of the cap 10 and bound laterally, in a circumferential direction, the outer protrusion 16. A front face 16*d* connects the first lateral face 16*a* and the second lateral face 16*b* and defines together with the first lateral face 16*a* and the second lateral face 16*b* thickness of the outer protrusion 16. Further, the outer protrusion 16 includes an upper face 16*c* and a lower face 16*e* that are opposite and substantially parallel to one another. The extent of the upper face 16*c* and of the lower face 16*e* on a respective plane that is orthogonal to the main axis C is greater than the thickness of the outer protrusion 16, i.e. than the extent in height along the main axis C of the side faces 16*a*, 16*b* and of the front face 16*d*. In other words, the lower face 16*e* and the upper face 16*c* have an extent prevailing circumferentially on the cap 10, i.e. have a greater dimension measured along the peripheral circumference of the cap 10. The thickness of the outer protrusion 16 is substantially constant, but can also not be constant, for example can progressively vary, or the upper face 16*c* or the lower face 16*e* can include ridges or hollows.

The cap 10 can further include an inner element, for example a seal ring 13, that is arranged inside the cup body and connected to an inner surface 11*b* (FIG. 9A) of the base wall 11. The seal ring 13, of substantially cylindrical shape, substantially coaxial with the side wall 12, protrudes from the inner surface 11*b* of the base wall or upper wall 11 inside the cup body of the cap 10 in the same direction as the extent of the side wall 12; in other words, the seal ring 13 has an outer diameter that is less than that of the side wall 12. The seal ring 13 extends for a length along the main axis C that is significantly less than the height of the side wall 12. The seal ring 13 can be an integral part of the cup body of the cap 10.

With reference to FIG. 9A, the base wall 11 is provided with an outer surface 11*a*, arranged outside the cup body, as well as outside the inner surface 11*b*, arranged inside the cup body of the cap 10. The inner surface 11*b*, in turn, can include a peripheral portion 11*c* arranged inside the cup body of the cap 10 and near the side wall 12. The peripheral surface 11*c* is thus bounded by the side wall 12 and by the inner element, in particular by the seal ring 13. The peripheral surface 11*c* has for example a circular crown shape.

Figure 1:
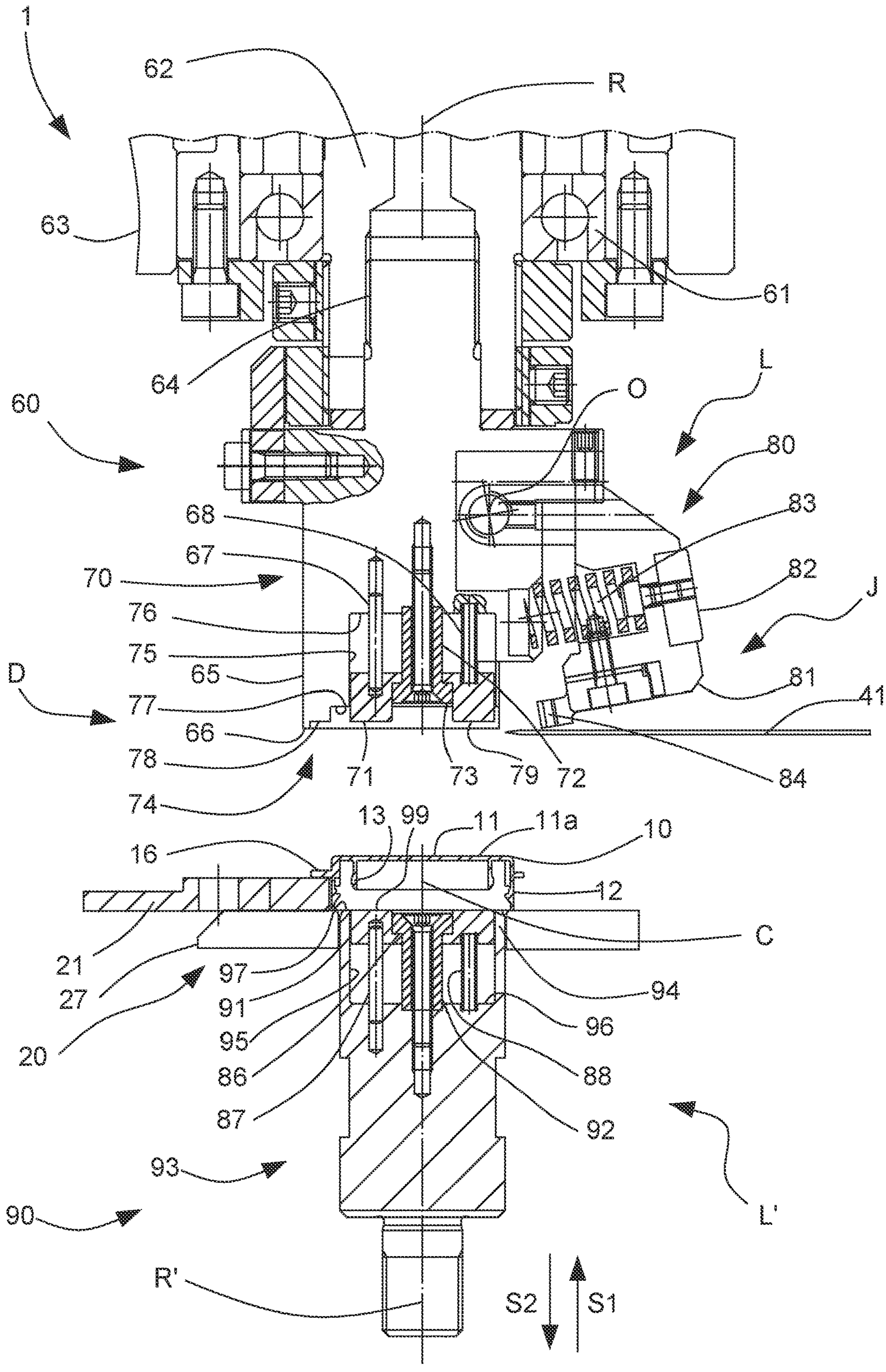
FIG. 1 is an axial section of a spindle unit and of a support unit for supporting caps provided in a cutting apparatus for cutting caps, in which the spindle unit and the support unit for supporting caps are shown in a spaced configuration.

As FIG. 1 shows, the cutting apparatus 1 includes a spindle-holding carousel 20, of known type, only a small portion of which is shown. The carousel 20 rotates around a vertical rotation axis, which is not shown, but is substantially parallel to the main axis C of the cap 10 in FIG. 1, and rotates around the vertical axis a plurality of spindles 70 and a plurality of respective supports 93 arranged for moving the caps 10 along an advancement path in an advancement direction T (FIG. 7), this advancement path being defined substantially in a peripheral circumferential zone of the carousel 20. Each spindle 70 is matched by a respective support 93. A spindle 70 and the respective support 93 interact with one cap 10 at a time. Each spindle 70 is included in a spindle unit 60 and each support 93 is included in a support unit 90.

Each spindle 70 can thus move along the advancement direction T and can rotate around an axis R of the spindle unit 60 thereof.

The support 93 can move along the advancement path together with the spindle 70 and is rotatingly fixed with respect to its axis R'. The axis R' is parallel to the axis R of the spindle 70, in particular is coaxial to the axis R.

The support 93, further, is movable along the axis R', or equivalently along the axis R if coaxial with the axis R', according to a lifting direction S1, to approach the spindle 70 so as to retain the cap 10 against the spindle 70 and according to a lowering direction S2, contrary to the lifting direction S1, to release the cap 10 and be able to receive a new cap.

The spindle 70 is shaped to interact with the cap 10 and to rotate the cap 10 around a rotation axis that is coaxial with the axis R, whilst the cap 10 is supported by the respective support 93. As will be set out in detail below, the spindle 70 is shaped to house the protrusion 16 so as to stop in use the rotation of the cap 10 in a preset position with respect to the spindle 70 so as to orient the cap 10 in a set angular position.

Each cap 10 is thus retained between the spindle 70 and the respective support 93 to permit cutting operations on the cap 10 in set positions of the side wall 12 with respect to the protrusion 16.

The cutting apparatus 1 includes a horizontal cutting zone 40 (FIGS. 2 and 7) and a vertical cutting zone 50 (FIGS. 3 and 7) that are reached and traversed by the spindle units 60 and by the respective support units 90 during operation of the cutting apparatus 1. The cutting apparatus 1 further includes an inlet or supply zone 30, shown in FIG. 6, and an unloading zone, which is not illustrated, downstream of the vertical cutting zone 50.

Figure 2:
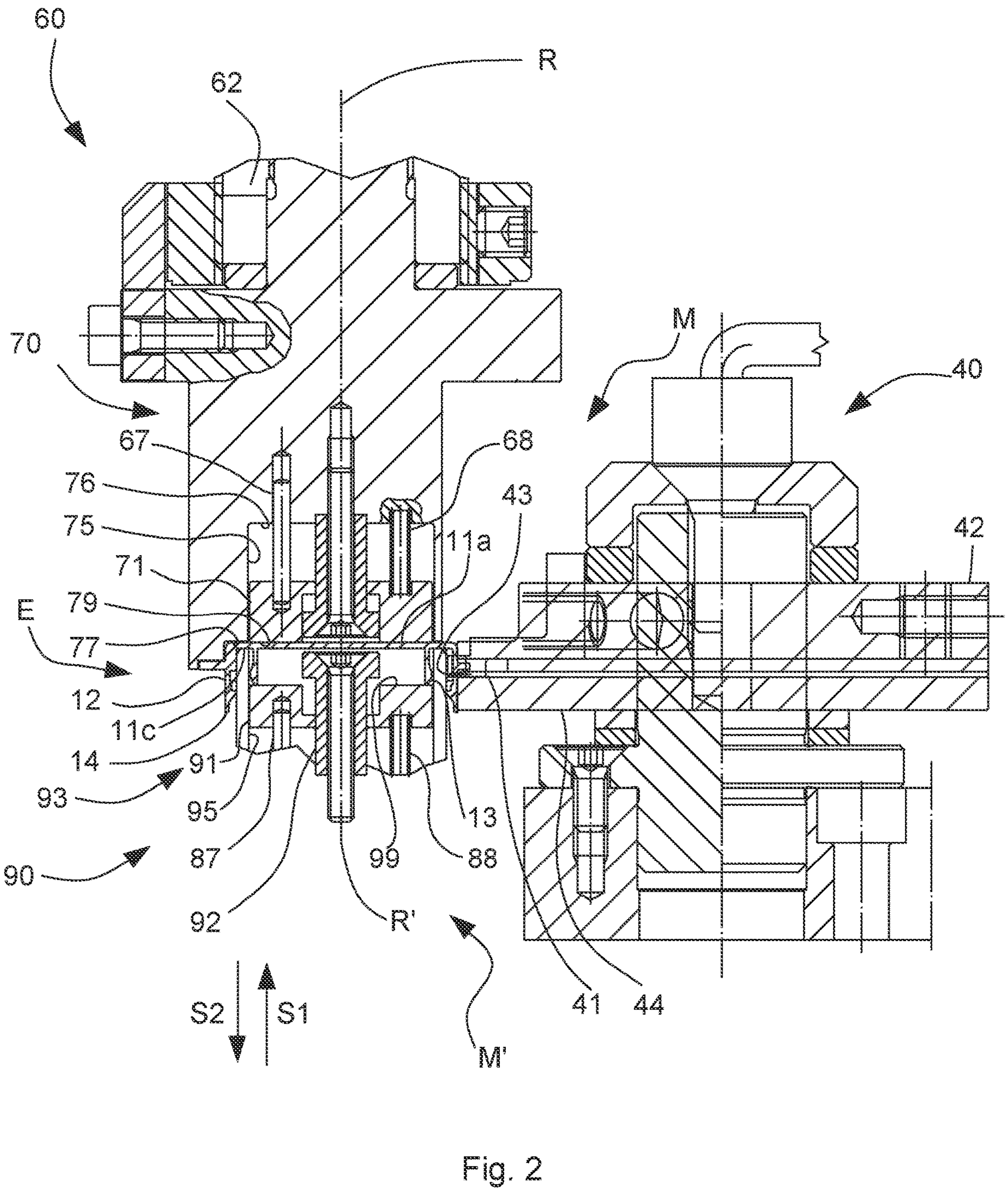
FIG. 2 is a partial and enlarged axial section of the spindle unit and of the support unit for supporting caps of FIG. 1 in a gripping configuration and in a horizontal cutting zone.
Figures 7, 8:
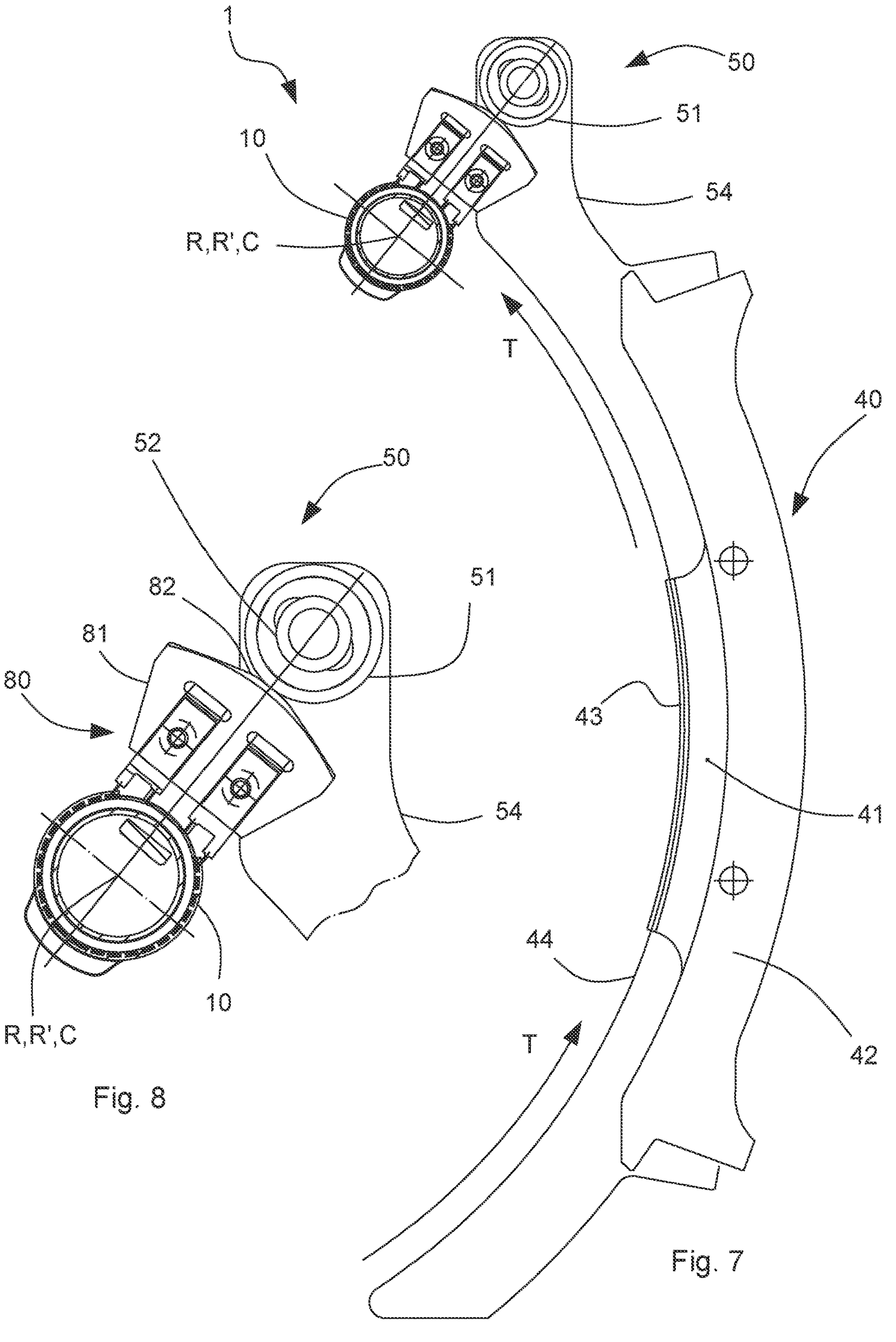
FIG. 7 is a plan view of a part of the cutting apparatus of FIG. 1, in which a horizontal cutting zone and a vertical cutting zone are shown.
FIG. 8 is an enlarged detail of FIG. 7 illustrating a snap cap at the vertical cutting zone and in a cutting position.

With reference to FIGS. 2 and 7, when the cap 10 is in the horizontal cutting zone 40, the cap 10 interacts with a fixed cutting device of the cutting apparatus 1, in particular, a horizontal cutting blade or knife 41, that makes an incision on the cap 10 according to a first horizontal direction that is parallel to a plane that is orthogonal to the main axis C of the cap 10, at an intermediate height between a height in which the outer protrusion 16 is connected to the body of the cap 10 and a height corresponding to the free edge 14 of the side wall 12. The horizontal cutting blade or knife 41 can be configured to obtain a circumferential weakening line on the cap 10 in order to form a tamper band.

The horizontal cutting zone 40 is located downstream of the supply zone 30, on the advancement path with a substantially circumferential arc shape along the advancement direction T. The horizontal cutting blade 41 includes a cutting edge 43 that, in a plan view like that of FIG. 7, is of a substantially circumferential arc shape and lies on a horizontal plane at a raised height with respect to a guide element 44, that acts as a contrasting surface on which the cap 10 rolls during the operation of horizontal cutting whilst the cap 10 is rotated on itself by the spindle 70. The horizontal cutting blade 41 is fitted removably to a first frame 42, for example connected to a base (which is not shown) of the carousel 20. FIG. 1 shows the position of the horizontal cutting blade 41 with respect to the spindle 70 and the corresponding height with respect to an edge surface 66 of a lower end 65 of the spindle 70.

Figure 3:
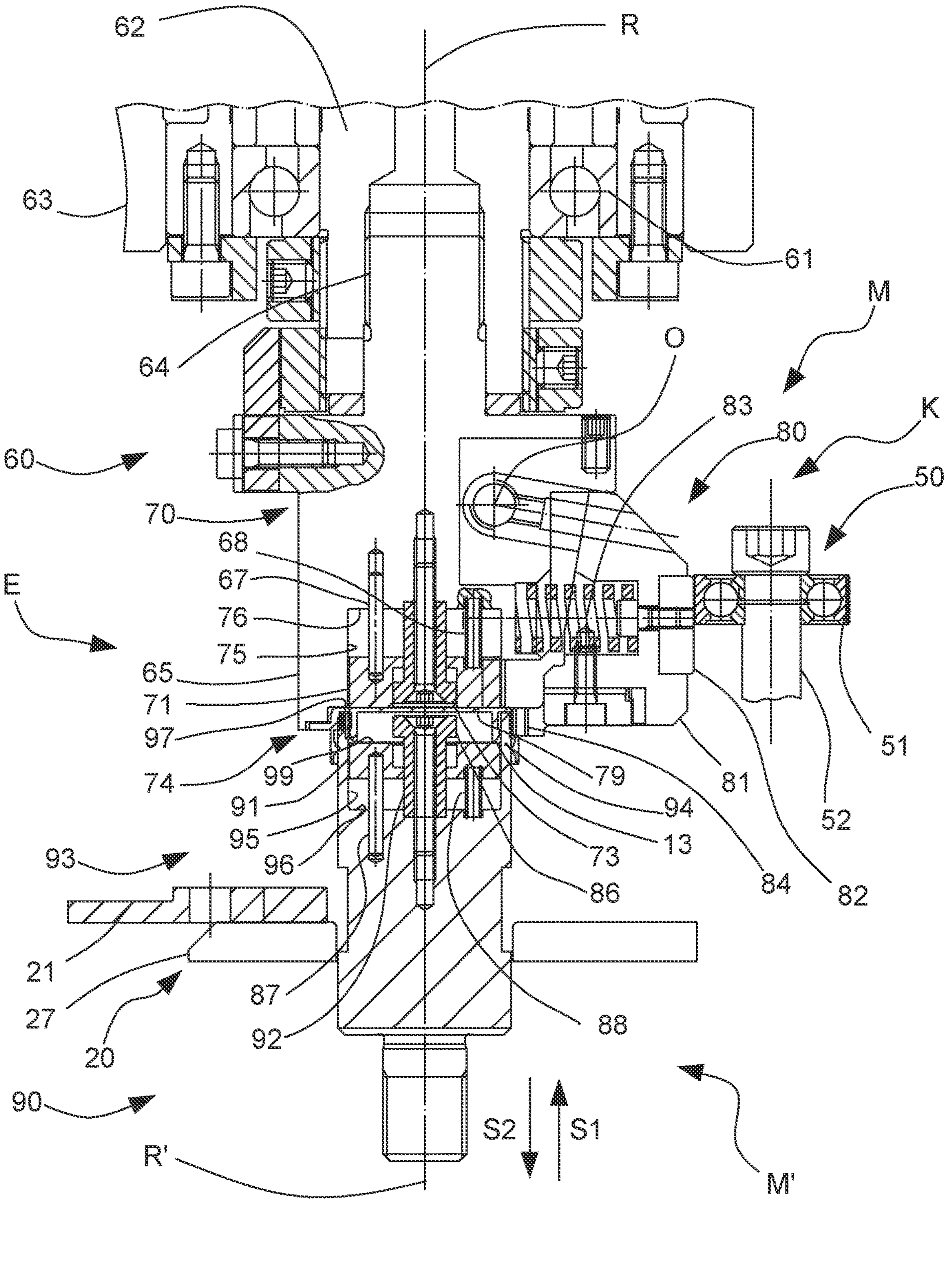
FIG. 3 is an axial section like that of FIG. 1 of the spindle unit and a partial section of the support unit for supporting caps in a gripping configuration and in a vertical cutting zone.

With reference to FIGS. 3, 7 and 8, when the cap 10 is in the vertical cutting zone 50, a cutting device 80 of the cutting apparatus 1 makes one or more incisions on the cap 10 according to a second direction that is substantially parallel to that of the main axis C of the cap 10, i.e. one or more vertical incisions. The angular position of the vertical incisions, when greater in number than one, can depend on the extent of the horizontal incision made in the horizontal cutting zone 40 and/or on the shape elements present in the cap 10, for example can depend on the position and on the extent of the outer protrusion 16 along the circumference of the cap 10.

In the embodiment shown, the vertical cutting zone 50 is thus downstream of the horizontal cutting zone 40, on the substantially circumferential arc shape the advancement path that the carousel 20 makes the plurality of caps 10 travel, by the plurality of spindle units 60 and by the plurality of support units 90. In an embodiment that is not shown, the vertical cutting zone 50 can be placed at the start of the advancement path of the caps 10 and, in this case, the cutting device makes one or more vertical incisions on the caps 10 before the horizontal cutting blade 41 acts on the caps 10. In a further embodiment that is not shown, the horizontal cutting zone can be divided into two horizontal cutting zones that are spaced apart from one another, a first horizontal cutting zone of which is at the start of the advancement path and a second horizontal cutting zone is nearer the end of the advancement path, thus providing two blades for horizontal cutting, each blade arranged in the respective horizontal cutting zone. In this embodiment, between the two horizontal cutting zones, the cutting device is interposed to make one or more vertical incisions on the caps; in this case the sequence of cuts or incisions includes at least one horizontal cut, then one or more vertical incisions, then again at least one further horizontal cut. The two horizontal cuts might not be distinguishable on the cap, both concurring to form weakening lines that defines the tamper band. The vertical cutting zone 50 includes a roller 51, which is suitable for abutting on a cam profile of a contrasting element 82 provided in the cutting device 80; the contact between the roller 51 and the contrasting element 82 enables the cutting device 80 to be driven that is fitted to the spindle 70, rotates together with the spindle unit 60, and is movable with respect to the spindle 70, as will be disclosed below. The roller 51 is fitted in a freely rotating manner to a shaft 52 fixed to a second frame 54, in a set angular position outside the carousel 20. The second frame 54 and thus the shaft 52 are fixed with respect to the carousel 20, whereas the roller 51 can rotate on the shaft 52. The second frame 54 can also coincide with the first frame 42 to which the fixed cutting device is fitted, i.e. the horizontal cutting blade 41.

The cutting device 80 is arranged for making a cut in the side wall 12 of the cap 10 when the spindle 70 reaches the cutting zone 50, provided in the advancement path along the advancement direction T.

The cutting device 80 is fitted to the spindle 70, is rotatable with the spindle 70 around the rotation axis R of the spindle 70 and includes an oscillating arm 81 that can oscillate around an axis of oscillation O orthogonal to the axis R. Unlike what is illustrated, the axis of oscillation O can also be tilted with respect to the axis R. In other words, the axis of oscillation O is not parallel to the axis R. The oscillating arm 81 can have, for example, an elevation section with a substantially "U" or arched shape. To a free or lower end of the oscillating arm 81 at least one blade 84 for vertical cutting is fitted. The blade 84 for vertical cutting thus has a cutting edge substantially parallel to the main axis C of the cap 10. The lower end of the oscillating arm 81 can include a plurality of blades, in particular blades for the vertical cut, for example parallel to one another and arranged at a set distance from one another. Some blades of the plurality of blades can be staggered with respect to the others so as to make incisions at different heights on the side wall 12 of the cap 10. Naturally, the blade 84 can also be a blade for tilted cutting, i.e. oblique with respect to the main axis C of the cap 10 but which is not a horizontal cut. The oscillating arm 81 can thus include a blade or a plurality of blades for vertical cutting or a blade or a plurality of blades for tilted cutting or a blade or a plurality of blades that is any combination of blades for vertical cutting and blades for tilted cutting.

The vertical cutting device 80 further includes a contrasting element 82 the cam profile of which is designed to contact the roller 51. The vertical cutting device 80 further includes an elastic element 83, for example a spring, with which the vertical cutting device 80 is connected to the spindle 70 and which enables the oscillating arm 81 to act as a follower when the contrasting element 82 comes into contact with the roller 51. The ends of the elastic element 83 interface, with known connections, respectively with a substantially central portion of the oscillating arm 81 facing the spindle 70 and a side portion of the spindle 70, facing the oscillating arm 81.

The oscillating arm 81 can then oscillate, relatively to the spindle 70, between two positions: an open position J, shown in FIG. 1, in which the blade 84 for vertical cutting is spaced further away from the spindle 70, and a closed or cutting position K, shown in FIG. 3, in which the blade 84 for vertical cutting is nearer the spindle 70 and, during operation, interacts with the side wall 12 of the cap 10.

With reference to FIG. 1, the oscillating arm 81, and thus the vertical cutting device 80, is maintained in the open position J by the force developed by the extending elastic element 83.

With reference to FIG. 3, the oscillating arm 81 is driven to oscillate by the roller 51 fitted to the fixed second frame 54 located in the cutting zone 50 outside the spindle 70. The vertical cutting device 80 is maintained in the closed or cutting position K by the action of the roller 51 that by the contact with the cam profile of the contrasting element 82 compresses the elastic element 83, so that the vertical cut blade or the plurality of vertical cut blades 84 abuts on and makes incisions in the side wall 12 in set points of the side wall 12.

With reference in particular to FIGS. 7 and 8, the contrasting element 82 fixed to the oscillating arm 81 has a cam or contact convex profile shaped so as to contact the roller 51, in a set point of a path travelled by the contrasting element 82, this path being given by the combination of the rotational motion of the carousel 20 on the vertical axis thereof and by the rotational motion of the spindle unit 60 on the axis R thereof. The contact between the roller 51 and the contact profile of the contrasting element 82 of the vertical cutting device 80 enables the vertical cut blade or plurality of blades 84 to be moved gradually to the side wall 12 of the cap 10 until incisions are made in the side wall 12 in the set points.

With reference now to FIGS. 1, 2 and 3, the spindle unit 60 includes the spindle 70 and a spindle-holding shaft 62 coupled together by known removable coupling, this coupling enabling the cutting apparatus 1 to be equipped with a possible different spindle (or parts thereof) suitable for operating on a different type of cap or dismantling the spindle 70 for general maintenance tasks. The spindle 70 and the spindle-holding shaft 62 are coupled so as to enable the spindle unit 60 overall to rotate around the axis R thereof. A bearing 61 (FIGS. 1 and 3) is fitted with the inner ring thereof on the spindle-holding shaft 62 and with the outer ring thereof on a frame 63 of the carousel 20.

The spindle-holding shaft 62 is further connected to a drive arrangement by a transmission that drives a rotation motion on the axis R of the spindle unit 60. This transmission is designed to synchronize the rotation motion of the carousel 20 with the rotation motion of the spindle unit 60. In other words, an angular position of the carousel 20 is matched by a set angular position of the spindle unit 60 around the axis R of the spindle unit 60. The spindle unit 60, further, during the entire operation of the cutting apparatus 1, substantially maintains the same height as the base (not shown) of the apparatus, oriented orthogonally to the axis R.

Each spindle 70 can thus move along the advancement direction T and can rotate around the axis R of the spindle unit 60. The spindle 70, as disclosed below, is shaped to interact with the cap 10, to rotate the cap 10 around a rotation axis that is coaxial with the axis R and to stop the rotation of the cap 10 in a set angular position.

With reference to FIG. 1, the spindle 70 has a substantially cylindrical shape and is provided with an upper end 64 for coupling with the spindle-holding shaft 62 and a lower end 65 arranged in use to interact with the cap 10. The spindle 70 further includes a cavity 75 into which a gripping insert 71 is at least partially inserted that is arranged for interacting with the cap 10, in particular arranged for contacting a portion of the cap 10 that is distinct from the protrusion 16.

The spindle 70 includes, on an edge portion of the cavity 75, an orientation seat or hollow housing 74, suitable for receiving at least one portion of the protrusion 16 of the cap 10 to permit the angular orientation of the cap 10 around the axis R with respect to the spindle 70. In this manner, the cap 10 can be oriented with respect to each cutting device of the cutting apparatus 1, such as for example to the blade 41 and/or to the cutting device 80, so as to ensure a precise position of the incisions on the side wall 12 of the cap 10.

Figure 4:
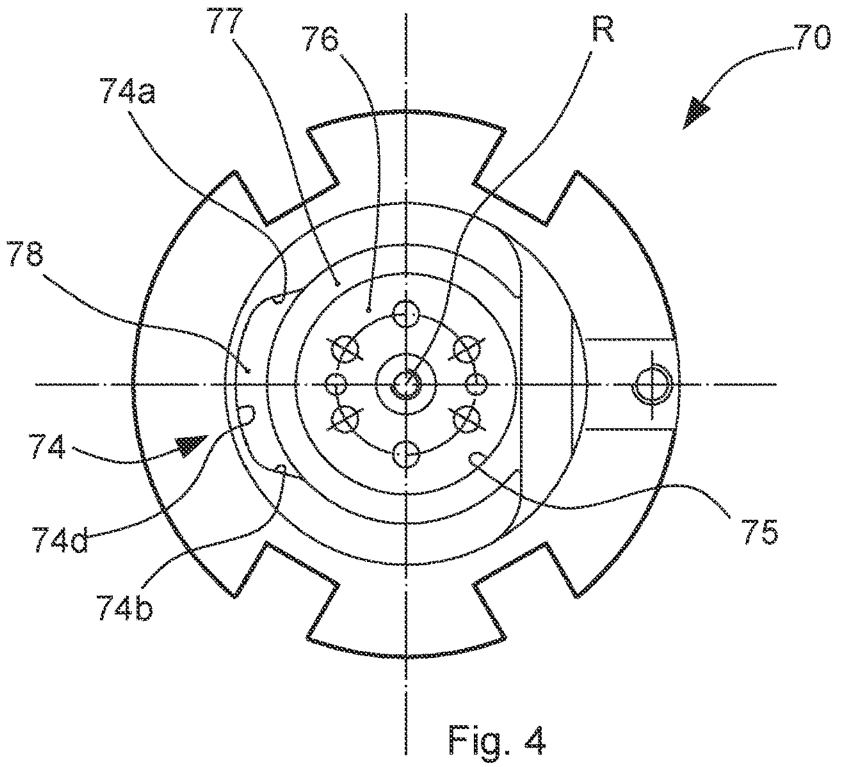
FIG. 4 is a bottom view of a spindle included in the spindle unit of FIG. 1.
Figure 5:
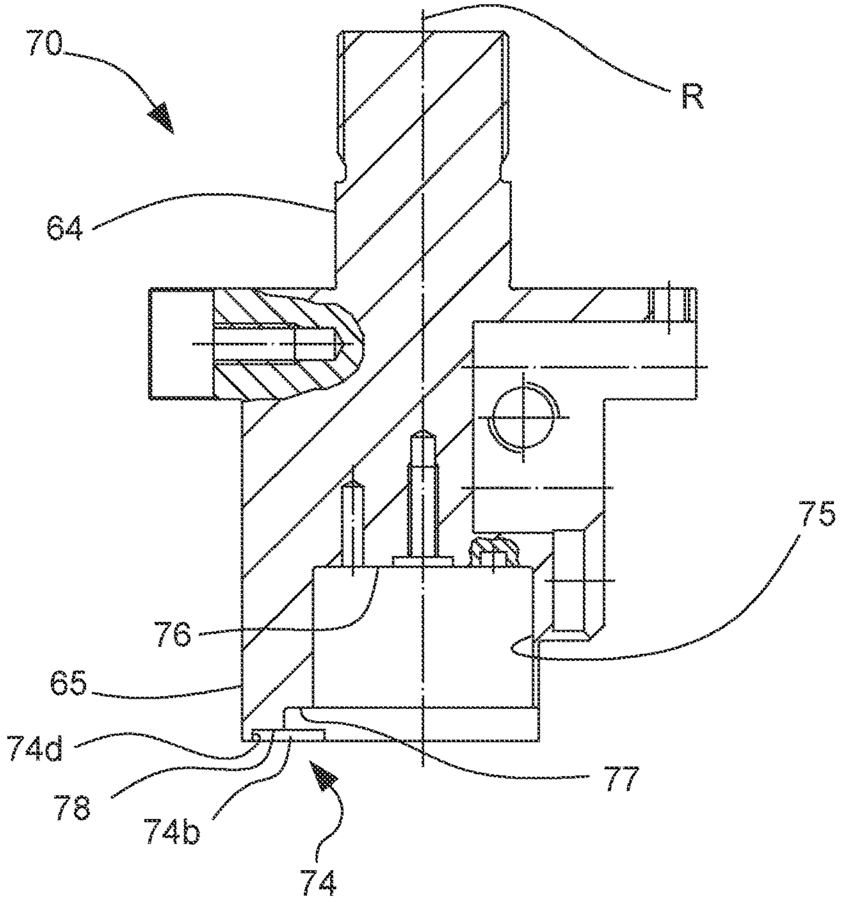
FIG. 5 is an axial section of a portion of the spindle of FIG. 4 illustrating a housing for a snap cap.

With reference to FIGS. 4 and 5, the orientation seat or hollow housing 74 includes an abutting surface 74*a*, 74*b* arranged for abutting on a respective side face 16*a*, 16*b* of the protrusion 16. Each abutting surface is shaped to cooperate with the respective side face 16*a*, 16*b* to stop the rotation of the cap 10 induced by the spindle 70. The hollow housing 74 further includes a containing surface 78, or upper surface, arranged for facing the face 16*c* of the protrusion 16. In other words, the containing surface 78 is substantially orthogonal to the axis R and limits the movements of the protrusion 16 inside the orientation seat 74 in an axial direction. The orientation seat or hollow housing 74 is thus a cube-shaped recess connected to the cavity 75. The orientation seat or hollow housing 74 further includes a front surface 74*d* arranged for facing and abutting on the front face 16*d* of the protrusion 16. The front surface 74*d* also acts as a containing surface, i.e. the front surface 74*d* contains or limits movements of the protrusion 16 inside the orientation seat 74, and is the surface of the orientation seat 74 that is most distant from the axis R. The abutting surfaces 74*a* and 74*b* are not orthogonal to the axis R, in particular they are surfaces that extend in a direction parallel to the axis R, but can also be tilted with respect to this axis. The hollow housing 74 further has a plan shape that is substantially the same as a plan shape of the protrusion 16, in particular the hollow housing 74 has a volume and a shape that are such as to trace the overall dimensions of the outer protrusion 16 apart from possible clearance.

The orientation seat or hollow housing 74 can house outer protrusions that can have a geometry that is different from that of the outer protrusion 16, provided that the overall dimensions of the outer protrusion, defined in the case of the protrusion 16 by the side faces 16*a* and 16*b*, by the front face 16*d* and by the upper face 16*c*, can be contained in the housing defined by the orientation seat 74.

The orientation seat 74 of the spindle 70 is shaped to house the protrusion 16 so as to stop in use a rotation of the cap 10 in a preset position with respect to the spindle 70, so as to orient the cap 10 with respect to the cutting device 80.

The spindle 70 further includes a stop surface 77 arranged for contacting the outer surface 11*a* of the base wall 11 outside the cup body. The stop surface 77 is in contact with the surface 11*a* when the cap 10 is retained between the support 93 and the spindle 70. The stop surface 77 includes a surface with a substantially circular crown arc shape.

The gripping insert 71 is movable axially along an axis, which can be coaxial with the axis R, between a rest position L, shown in FIG. 1, in which the gripping insert 71 is further from a bottom region 76 and, on the basis of the relative position between the support 93 and spindle 70, does not interact or come into contact with the cap 10, and a work position M, shown in FIGS. 2 and 3, in which the gripping insert 71 is nearer the bottom region 76 of the cavity 75 and, during operation, contacts the outer surface 11*a* of the cap 10. The gripping insert 71 is of annular shape and fixed to the bottom region 76 of the cavity 75 through an elastic element, for example a spring 68. One or more stiff centring elements, for example a centring pin 67, are arranged for guiding the gripping insert 71 during axial movement. In the bottom region also indicated as ceiling 76 there are thus one or more concave housings (FIG. 5), or dead holes, suitable for engaging the ends respectively of the elastic element 68 and of one or more stiff centring elements 67. The gripping insert 71 has concave housings, or dead holes, on an upper surface thereof that are respectively suitable for engaging the ends of the elastic element 68 and the ends of one or more stiff centring elements 67. The concave housings present on the upper surface of the gripping insert 71 are arranged at the concave housings present on the ceiling 76. The elastic element 68 and the one or more stiff centring elements are arranged in a direction substantially parallel to the axis R of the spindle unit 60.

The spring 68, connected to the bottom region 76 and to the gripping insert 71, is arranged for pressing the gripping insert 71 against the outer surface 11*a* of the base wall 11 of the cap 10 during operation.

The gripping insert 71 is slidable along a stem 72 fixed to the spindle 70 at a substantially central area of the ceiling 76. The stem 72 has a substantially cylindrical shape and, in a portion facing the cap 10, has an enlarged section in the diameter, i.e. a head 73. The head 73 performs the function of stop element for the gripping insert 71 in the rest position L, so that the latter is retained inside the cavity 75.

The gripping insert 71 has as a lower surface as an end surface 79 that has a circular crown arc shape having an outer diameter that is less than the inner diameter of the circular crown arc of the stop surface 77.

As indicated above, the gripping insert 71 can move along a direction substantially parallel to the axis R of the spindle unit 60 between the rest position L and the work position M. With reference to FIG. 2 and to FIG. 3, in the work position M, the gripping insert 71 is so positioned that the end surface 79 of the gripping insert 71, intended for contacting the outer surface 11*a*, is substantially at the same height as the stop surface 77. In the work position M of the gripping insert 71, the end surface 79 of the gripping insert 71 is in contact with a respective circular crown arc portion of the outer surface 11*a* of the upper wall 11 of the cap 10 and is at an upper height with respect to the height acquired in the rest position L of the gripping insert 71; in the work position M, the gripping insert 71 exerts a pressure, by the spring 68, on the outer surface 11*a* of the upper wall 11 of the cap 10.

With reference to FIG. 1, in the rest position L, the gripping insert 71 is so positioned that the end surface 79 is at a lower height than the stop surface 77. In other words, in the rest position L of the gripping insert 71, the spring 68 is in the condition of maximum extent and the head 73 prevents a further translation downwards of the gripping insert 71. In the rest position L, the end surface 79 of the gripping insert 71 protrudes downwards to a lower height than that of the lower end of the head 73, a height lower than that of the stop surface 77.

With reference to FIGS. 1, 3 and 5, the spindle 70 further has a side recess or side housing that extends from a portion of the side surface to the axis R of the spindle 70. This side recess is suitable for housing the vertical cutting device 80.

The support unit 90 includes the support 93, which is also indicated as a lifter 93. In use, the support unit 90 moves with a substantially rotational motion around the vertical rotation axis of the carousel 20 because it is connected by a connecting member (not shown) to the carousel 20.

With reference to FIGS. 1, 2 and 3, the lifter 93 has a substantially cylindrical shape that extends along the main axis R' of the support unit 90 and is provided with a lower end for coupling with a cam mechanism (not shown) and an upper end facing in use the cap 10 and the spindle 70.

As already disclosed in preceding paragraphs, the support 93 can move along the advancement path together with the spindle 70 and is rotationally fixed with respect to the axis R', and thus also with respect to the axis R. The axis R' of the support 93 is for example coaxial with the axis R of the spindle 70. The support 93 is shaped to interact with the cap 10 and to retain the cap 10 against the spindle 70.

As disclosed above, the support 93 is movable along the axis R', or equivalently along the axis R if coaxial with the axis R', in the lifting direction S1 and in the lowering direction S2, to respectively move towards and move away from the spindle 70. The support 93 is thus drivable between a spaced configuration D, shown in FIG. 1, in which the support 93 is spaced further away from the spindle 70, and a gripping configuration E, shown in FIGS. 2 and 3, in which the support 93 is nearer the spindle 70 to retain the cap 10 in a set angular position.

The translation movement of the support unit 90 along the lifting direction S1 or the lowering direction S2, i.e. along the axis R', is possible because the support unit 90 is connected to a cam mechanism (not shown) that controls the axial movement thereof synchronously with the rotation of the carousel 20, between the spaced configuration D and the gripping configuration E.

The support 93 further includes a further cavity 95 into which a further gripping insert 91 is inserted at least partially that is movable axially along the axis R' between a further work position M', shown in FIGS. 2 and 3, in which the further gripping insert 91 is nearer a bottom wall 96 of the further cavity 95 and, during operation, interacts with the inner element 13 of the cap 10, in particular by pressing the inner element 13, and a further rest position L', shown in FIG. 1, in which said further gripping insert 91 is further from said bottom wall 96 and, during operation, on the basis of the relative position between the support 93 and spindle 70, does not interact or come into contact with the inner element 13 of the cap 10.

The support 93 further includes a stem element 92, on which the further gripping insert 91 can slide, this stem element 92 being provided with a further head 86 that operates as a stop element for the further gripping insert 91, when the further gripping insert is in the further rest position L'.

The further gripping insert 91 has a substantially hollow cylindrical shape, the hole of which, in a central position, is coupled with clearance with the cylindrical portion of the further stem element 92, such that the further gripping insert 91 can slide axially until it abuts on the further head 86. The further stem element 92, is fixed to the support 93 at a central area of the bottom wall 96.

Moving the further gripping insert 91 between the two positions L' and M' is possible through the effect of the presence of a further elastic element, for example a spring 88, and one or more further stiff guiding and centring elements, for example a guiding and centring pin 87. The further elastic element 88 is connected to the bottom wall 96 and to the further gripping insert 91 and is arranged for pressing the further gripping insert 91 against the inner element 13 of the cap 10, during operation, in particular when the support 93 is in the gripping configuration E and the further gripping insert 91 is in the further work position M'. The further gripping insert 91 has concave seats, or dead holes, on a lower surface thereof respectively suitable for engaging the ends of the further elastic element 88. The concave housings or dead holes present on the lower surface of the further gripping insert 91 are arranged at the concave seats present on the bottom wall 96, such that the further elastic element 88 is arranged in a direction substantially parallel to the axis R' of the support unit 90. Also the one or more further stiff guiding and centring elements 87 are arranged parallel to the axis R'. For example, the guiding and centring pin 87 is fixed to the further gripping insert 91 and is received in a sliding hole obtained in the bottom wall 96, inside which it can slide to guide the further gripping insert 91 to move along the axis R'.

From what has been set out above and from the Figures, it can be noted that the structure of the further gripping insert 91 and the elements that permit sliding thereof are identical to the structure and to the elements that enable the gripping insert 71 to be moved in the cavity 75 provided on the spindle 70.

The further gripping insert 91 has an upper surface, facing the spindle 70 and, in use, facing the cavity of the hollow body of the cap 10, an end surface 99, that can have a circular crown shape. This end surface 99 is arranged for contacting the inner element 13 or, if the inner element 13 is not present, the lower surface 11*b* of the base wall 11 of the cap 10.

The support 93 includes a contact surface 97 arranged for contacting the peripheral portion 11*c* of the inner surface 11*b* of the base wall 11. The contact surface 97 is in particular an upper end surface of an annular wall 94 that bounds the further cavity 95 of the support 93.

The contact surface 97 is in contact with the peripheral portion 11*c* when the cap 10 is retained between the support 93 and the spindle 70, i.e. in the gripping configuration E of the support 93. This contact surface 97 has a circular crown shape and has an inner diameter that is greater than an outer diameter of the peripheral circular crown arc of the end surface 99 of the further gripping insert 91. This contact surface 97 further includes a peripheral circular crown arc of the support 93, which is radially more distant from the axis R, or equivalently from the axis R', when R and R' are coaxial.

With reference to FIG. 3, in the further work position M', the further gripping insert 91 is so positioned that the end surface 99 of the further gripping insert 91, intended for contacting the inner element 13, is substantially at a lower height than the contact surface 97. In fact, in the further work position M' the end surface 99 of the further gripping insert 91 is in contact with the lower edge of the seal ring 13 of the cap 10 and the further gripping insert 91 exerts a pressure, by the further elastic element 88, on the lower edge of the seal ring 13 of the cap 10.

Again with reference to FIG. 1, in the further rest position L', the further gripping insert 91 is so positioned that the end surface 99 is at the same height as the contact surface 97. In other words, in the further rest position L' of the further gripping insert 91, the further elastic element 88 is in the condition of maximum extent and the abutting annular surface of the further head element 86 prevents further upward translation of the further gripping insert 91.

In the spaced configuration D of the support unit 90, the support unit 90 is not engaged in the cap 10 and the contact surface 97 is at a height that is substantially the same as a guide plane 27 of the carousel 20 on which the caps 10 coming from the supply zone 30 transit. The spaced configuration D of the support unit 90 corresponds to the rest position L of the gripping insert 71. The spaced configuration D of the support unit 90 further corresponds to the further rest position L' of the further gripping insert 91. In other words, when the support unit 90, and thus the support 93, is in the spaced configuration D, the gripping insert 71 and the further gripping insert 91 are in the respective rest positions L and L'.

With reference to FIG. 3, in the gripping configuration E of the support unit 90, the support unit 90 is engaged in the cap 10 and is at a height that is such that the cap 10 is in contact with the gripping insert 71 of the spindle 70 and the protrusion 16 is inserted into the orientation seat 74. The gripping configuration E of the support unit 90 corresponds to the further work position M' of the further gripping insert 91. The gripping configuration E of the support unit 90 further corresponds to the work position M of the gripping insert 71. In other words, when the support unit 90, and thus the support 93, is in the gripping configuration E, the gripping insert 71 and the further gripping insert 91 are in the respective work positions M and M'.

In the gripping configuration E, in the spaced configuration D of the support unit 90, in the respective work positions M', M and rest positions L', L of the further gripping insert 91 and of the gripping insert 71, the rotation axis R of the spindle unit 60 and the rotation axis R' of the support unit 90 are substantially aligned on one another and on the main axis C of the cap 10.

Figure 6:
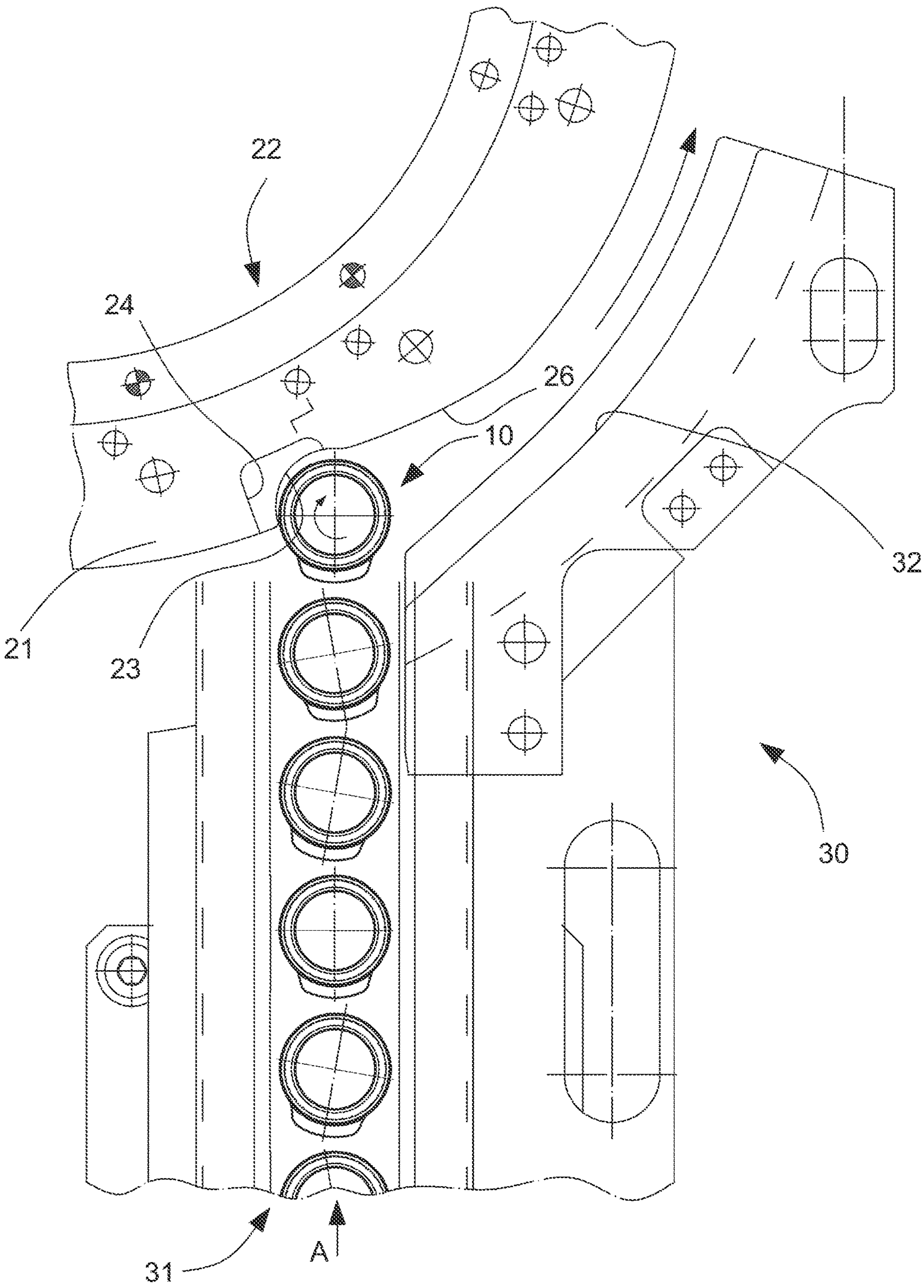
FIG. 6 is a schematic plant of a supply zone for supplying caps of the cutting apparatus of FIG. 1.

With reference now to FIG. 6, as already indicated above, the cutting apparatus 1 includes an inlet or supply zone 30. The supply zone 30 is positioned downstream of a preceding working station (which is not illustrated), for example a forming station for forming the caps 10, from which the cutting apparatus 1 receives the plurality of caps 10. In the supply zone 30, each cap 10 is rotated slightly to facilitate the insertion of the outer protrusion 16 of the cap 10 into the orientation seat or hollow housing 74 of the spindle 70 when the support 93 brings the cap 10 near to the spindle 70. The supply zone 30 can include a conveyor 31, for example a conveyor belt of known type, suitable for moving along a supply direction A a plurality of caps 10 placed in a row one after the other, maintaining the caps 10 thereof with the concavity downwards, i.e. with the base wall or upper wall 11 facing upwards. This conveyor 31 conveys the plurality of caps 10, which are not oriented angularly around the main axis C thereof, to a pre-orientation zone 22 which includes a pre-orientation member 21 and a curved guide 32 both extending in a substantially circumferential arc shape plan, bounding a passage for the caps 10 and suitable for guiding and permitting each cap 10 to rotate slightly.

The pre-orientation member 21 has:

a recess 24 for outer protrusion, suitable for receiving the outer protrusion 16 of one of the caps 10;

a transition zone 26, in which a tilted surface of the pre-orientation member 21 extends gradually from the recess 24 to an outer edge of the pre-orientation member 21 for a set angle of rotation of the pre-orientation member 21; the transition zone 26 is suitable for advancing gradually the cap 10 to the curved guide 32;

an abutment for a side wall 23, i.e. a recess the shape of which is suitable for coupling with a portion of the side wall 12 of the cap 10, to enable the latter to rotate around its own axis.

In use, with reference to FIG. 6, the conveyor 31 pushes the plurality of caps 10 along the supply direction A. The pre-orientation member 21, which is driven with circular motion, receives the side wall 12 of the cap 10 and pushes the side wall 12 of the cap 10 by the abutment for the side wall 23 to the curved guide 32. The cooperation between the pre-orientation member 21 and the curved guide 32 thus permits a slight rotation on the main axis C of the outer protrusion 16 that can be oriented until it engages the corresponding recess for an outer protrusion 24; this occurs along a path that has a substantially circumferential arc shape that extends along the length of the curved guide 32 of the supply zone 30. On the edge of the pre-orientation member 21, multiple pre-orientation zones 22 can be provided, for example spaced apart from one another by the same angular distance.

At the cooperation portion between the pre-orientation member 22 and the curved guide 32, the support unit 90 is moved by the cam mechanism upwards in the lifting direction S1, parallel to the axis R', to intercept the cavity of the cap 10 and take the cap 10 to the spindle 70. The support 93, in particular the annular wall 94, and the further gripping insert 91, enter the cavity of the cap 10. In this manner, the support 93 lifts the cap 10 from a height that is substantially the same as that of the guide plane 27 to an upper height, such that the gripping insert 71 of the spindle 70 interacts with the cap 10, contacting the outer surface 11*a* of the upper wall 11. The gripping insert 71 and the further gripping insert 91, owing to the elastic elements 68, 88, perform a progressive gripping operation. In the meantime, the spindle 70 is rotating on the axis R synchronously with the carousel 20.

During the ascent of the support unit 90 along the lifting direction S1, the gripping insert 71 of the spindle 70 comes into contact with the cap 10 and transmits the rotation motion to the cap 10 around the axis R. In the support unit 90, the contact surface 97 and the annular wall 94 of the support 93 and the further gripping insert 91 are sized to enable the cap 10 to slide rotatingly with respect to the support 93 when the cap 10 is rotated by the spindle 70.

The approach movement in the lifting direction S1 of the support unit 90 to the spindle unit 60 together with the rotation of the spindle unit 70 around the axis R enables the cap 10 to be rotated from the spindle 70 and to the outer protrusion 16 of the cap 10 rotated to enter the orientation seat 74 and to remain in this position owing to the pressing action on the cap operated by the gripping insert 71 and by the further gripping insert 91. In detail, the abutting surfaces 74*a* and 74*b* of the orientation seat 74 come to be located respectively at the side faces 16*a* and 16*b* of the outer protrusion 16. According to the direction of rotation of the spindle unit 60 and of the cap 10 around the axis R, contact is provided of one of the side surfaces 74*a* or 74*b* of the orientation seat or hollow housing 74 with a respective side face 16*a* or 16*b* of the protrusion 16. This contact limits or even prevents the cap 10 from sliding with respect to the spindle 70, thus ensuring also the synchronization of the cap 10 with the movement of the carousel 20. The orientation seat or hollow housing 74 contributes to the transmission of the rotation motion from the spindle 70 to the cap 10 and enables an angular position to be defined of the cap with respect to the spindle 70. In other words, once the orientation seat 74 is engaged by the outer protrusion 16, the rotation motion of the spindle unit 60 around the axis R is transmitted to the cap 10 without sliding between the cap 10 and the spindle 70 and the rotation motion of the cap 10 is synchronized both with the carousel 20 and with the spindle unit 60. In yet other words, the gripping insert 71 moves from the rest position L to the work position M; the further gripping insert 91 moves from the further rest position L' to the further work position M' whilst the support unit 90 moves from a spaced configuration D to the gripping configuration E. The cutting device 80 is in the open position J.

The spindle unit 60 and the support unit 90, rotating together with the carousel 20, travel along a circumferential arc shaped path keeping the cap 10 clamped therebetween with a force sufficient to maintain the cap 10 with the protrusion 16 housed in the hollow housing 74 of the spindle 70 nevertheless enabling the cap 10 to rotate together with the spindle 70 by sliding on the support 93, which remains fixed with respect to the rotation of the spindle 70. The spindle unit 60 and the respective support unit 90 move away from supply zone 30 and take the cap 10 near the horizontal cutting zone 40. In the horizontal cutting zone 40, the horizontal cutting blade 41 makes an incision on the cap 10 at a set height on the side wall 12 for a preset circumferential extent of the side wall 12, which is overall equal to the length of the cutting edge 43 of the horizontal cutting blade 41 against which the cap 10 interacts. The horizontal cutting blade 41, according to the shape of the cutting edge 43 of the blade, can make a plurality of horizontal incisions spaced by interruptions, in which the material of the cap 10 has not been perforated; for example, if the horizontal cutting blade 41 makes incisions that are near and substantially equal to one another, the interruptions between the cuts form the so-called bridges on the side wall 12, which connect a tamper ring to the remaining part of the side wall 12. One or more vertical cuts can be made on more extended interruptions, i.e. larger zones of non-perforated side wall 12, when the cap 10 reaches the vertical cutting zone 50.

The spindle unit 60 rotating together with the carousel 20 and on the axis R thereof, in the continuation of the initiated circumferential arc path, moves away from the horizontal cutting zone 40 and moves near the vertical cutting zone 50. In a set point on the path, the cutting device 80 interacts with the roller 51, going from the open position J to the closed or cutting position K and thus making an incision on the side wall 12 on the set cap 10 portions.

In one embodiment, the support unit 90 can be freely rotatable on the axis R' thereof and thus free to rotate on the rotation axis R' thereof, and can be thus dragged by the rotational motion of the spindle unit 60, when both the gripping insert 71 and the further gripping insert 91 are in the respective work positions M, M'; in this embodiment, the rotational motion around the axis R of the spindle 70 is transmitted, by the cap 10, to the support unit 90, when the support unit 90 is in the gripping configuration E. It is also possible to provide a further embodiment that is not shown in which the rotation axis R of the spindle is not coaxial with the rotation axis R' of the support unit.

Owing to the conformation of the spindle, it is possible to obtain a cutting apparatus for making incisions in non-axisymmetrical caps externally without limiting or even eliminating all sliding between the cap and the spindle of the cutting apparatus.

Owing to the hollow housing 74, the cutting apparatus 1 ensures a correct position of the incisions on the caps, in particular of the vertical incisions. In fact, the hollow housing permits precise orientation of the cap with respect to a blade of the cutting devices present in the cutting apparatus, in particular a vertically cutting blade. A correct position of the cap 10 with respect to the cutting devices enables greater precision of the cuts and thus a more repeatable end product to be obtained.

The cutting apparatus 1 disclosed above makes horizontal incisions and vertical cuts on a snap cap, in which the outer protrusion 16 is a tab or an engaging portion engaging with the fingers on which the user acts to open the container to which cap is applied. By adopting a different shape from the one disclosed and illustrated of the hollow housing of the spindle and, optionally, of the respective gripping inserts of the spindle and/or of the gripping inserts of the support, the cutting apparatus can make incisions and notches also on caps having an outer protrusion of a different shape from the engaging portion for the fingers of the snap cap of FIG. 9. For example, the hollow housing can be shaped to house at least partially a hinge present on the cap, as provided in the embodiments disclosed below. In these embodiments, the parts common to the cap 10 are indicated by the same reference numbers. The parts that are similar in function but have a different shape are indicated by reference numbers having the same units and tens but increased by hundreds.

Figure 10:
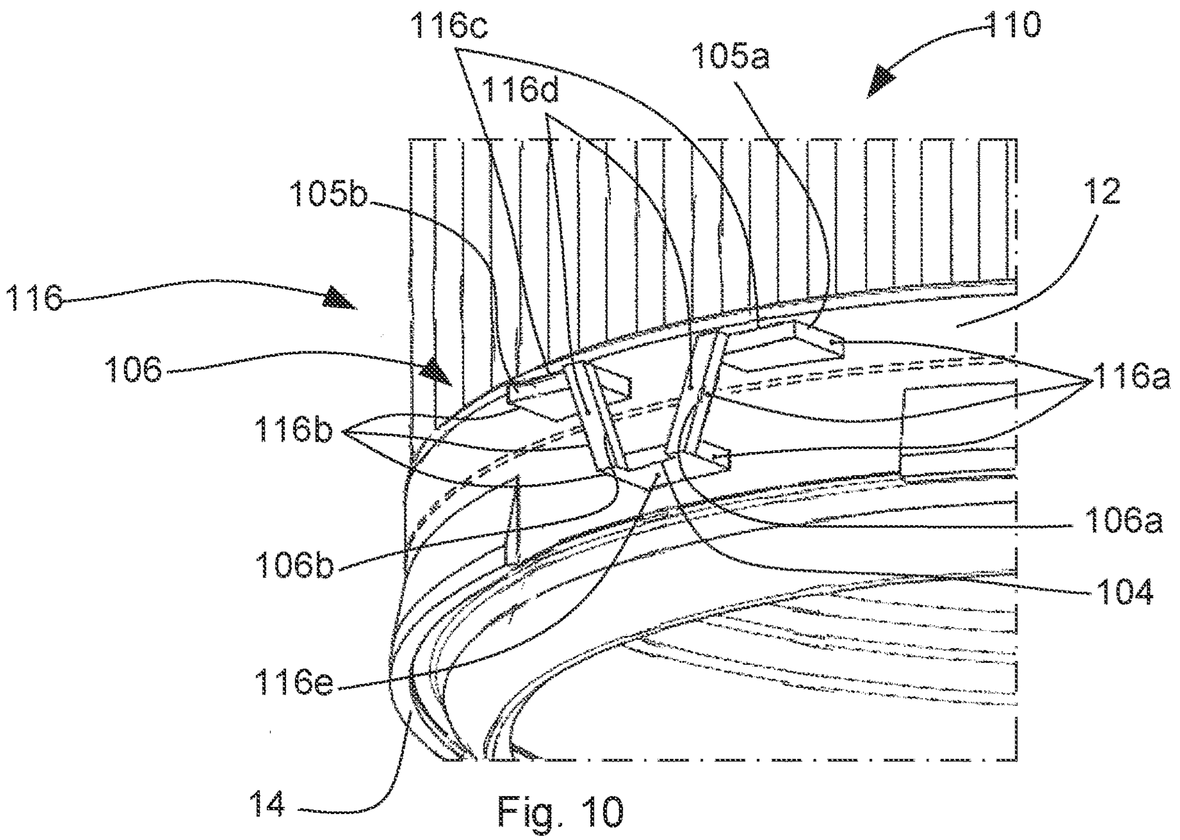
FIG. 10 is a perspective partial view of a cap with a strap hinge that is suitable for being housed in a second embodiment of the spindle.

With reference to FIG. 10, an embodiment is shown in which a cap 110 includes an outer protrusion 116 of complex shape, including a plurality of parts protruding from the side wall 12, which define a strap hinge 106. The overall shape of the strap hinge 106 is reminiscent of an upturned trapezoidal shape or a "V" shape. The outer protrusion 116 includes three joining parts 104, **105*a*, 105*b*, two of which are upper joining parts 105*a*, 105*b*, and one part of which is a lower joining part 104. The outer protrusion 116 further includes two tilted strips 106*a*, 106*b* that converge in the direction of the free edge 14 of the cap 116. The joining parts 104, 105*a*, 105*b* are cuboid elongated elements placed at different heights on the side wall 12. The two tilted strips 106*a*, 106*b* are connected to the same lower joint part 104 in a zone near the free edge 14 of the cap 110 and to a respective part of upper joint 105*a*, 105*b*, the two upper joining parts 105*a*, 105*b* being placed at the same height and being angularly spaced apart from one another on the side wall 12 of the cap 110. The end surfaces of the strap hinge 106 include a plurality of first side faces 116*a* and a plurality of second side faces 116*b* opposite the first side faces 116*a*. The first and the second side faces 116*a*, 116*b* are surfaces belonging to the joining parts 104, 105*a*, 105*b* and to the tilted strips 106*a*, 106*b*. The first and the second side faces 116*a*, 116*b* extend substantially parallel to the main axis of the cap 110 and bound laterally, in a circumferential direction, the outer protrusion 116**.

The two tilted strips **106*a*, 106*b* each include a respective front face 116*d*; the front faces 116*d* are surfaces that are the greatest distance from the axis of the cap 110**.

The outer protrusion 116 also includes a plurality of upper faces **116*c*, in particular an upper face 116*c* for each part of upper joint 105*a*, 105*b*. The two upper faces 116*c* are at the same height measured along the axis of the cap 110, i.e. are aligned. The outer protrusion 116 further includes a lower face 116*e* that is opposite the upper faces 116*c* and is a surface of the lower joint part 104. The upper faces 116*c* and the lower face 116*e* are substantially parallel to one another, thus the distance between the upper faces 116*c* and the lower face 116*e* along the axis of the cap 110 is constant. The upper faces 116*c* and the lower face 116*e* are substantially flat, but can also include ridges or dips. The lower face 116*e* and upper faces 116*c* have a circumferentially prevalent extent in relation to the cap 110, i.e. have a dimension that is greater measured along the peripheral circumference of the cap 110**.

The function of the first and second side faces **116*a*, 116*b* is the same as the side faces 16*a* and 16*b* of the cap 10 of FIGS. 1 to 9, if the overall dimensions of the outer protrusion 116, defined by the side faces 116*a* and 116*b* that are more distant from one another—i.e. the side faces 116*a* and 116*b* of the two upper joining parts 105*a*, 105*b*—by the front faces 116*d* and by the upper faces 116*c*, are contained in the seat defined by the orientation seat 74, then the cutting apparatus 1 can be used for making incisions also in the caps 110 with a strap hinge 106**.

Alternatively to the apparatus embodiments disclosed above, an embodiment of the cutting apparatus can be provided that is not shown, in which the spindle has an orientation seat or hollow housing shaped to house the outer protrusion 116. In particular, the hollow housing includes an abutting surface or a plurality of abutting surfaces, arranged for abutting on one or more of the side faces, for example one or more of the first side faces **116*a* or on one or more second side faces 116*b* or all the side faces 116*a*, 116*b*. Also in these embodiments of the cutting apparatus, the hollow housing is shaped so as to have the abutting surface non-orthogonal to the axis R so as to cooperate with the respective side face 116*a*, 116*b* to stop in use the rotation of the cap 110 in a preset position with respect to the spindle, so as to orient the cap 110 with respect to each cutting device 41, 80. As for the embodiment of FIGS. 1 to 9, the hollow housing further includes a containing surface arranged for facing the upper faces 116*c* of the outer protrusion 116, i.e. the faces having the greater circumferential extent, the containing surface being able to be substantially orthogonal to the axis of the spindle. The hollow housing can have a plan shape substantially the same as a plan shape of the outer protrusion 116**.

Figure 11:
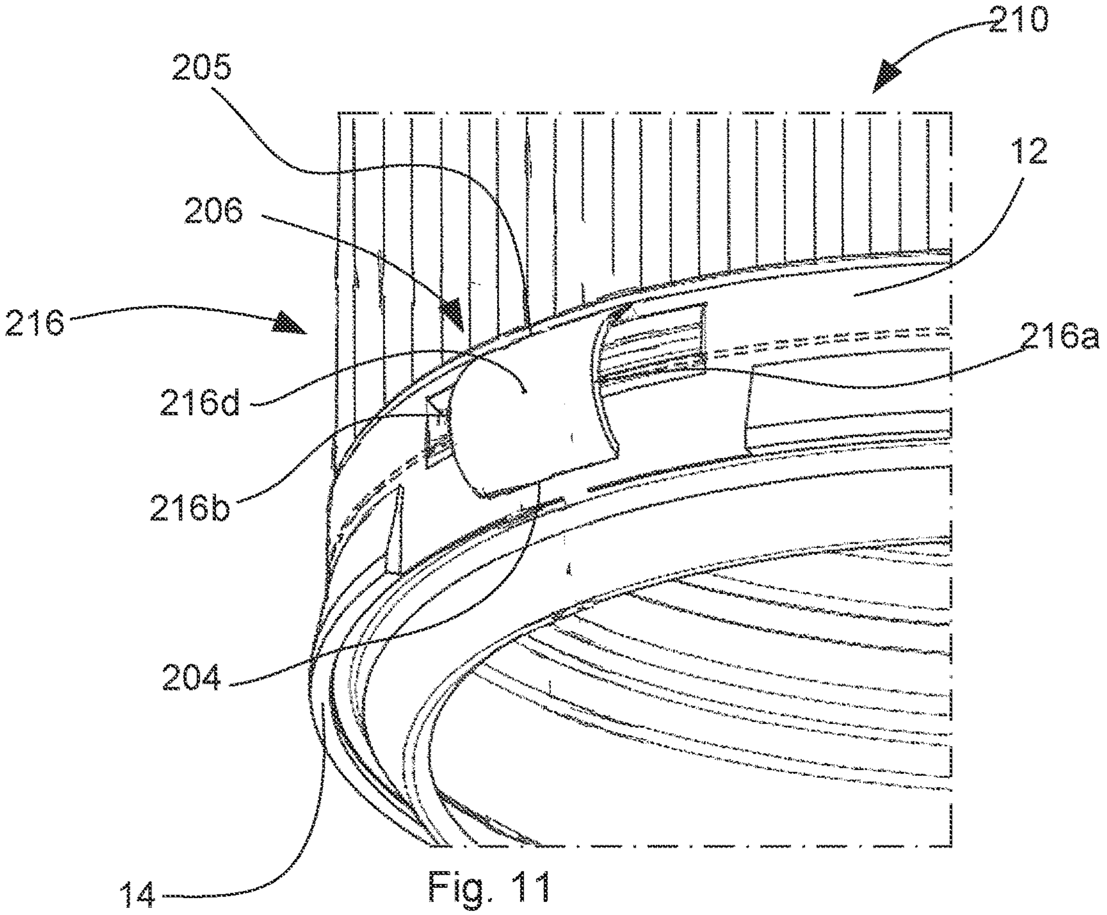
FIG. 11 is a perspective partial view of a cap with an arc hinge that is suitable for being housed in a third embodiment of the spindle.

With reference now to FIG. 11, a cap embodiment 210 is shown having an outer protrusion 216 that includes an arc-type hinge 206. The arc hinge 206 includes an arched band 206, in the shape of an arc having two joining parts, a lower joining part 204 and an upper joining part 205, that connect the arc to the side wall 12 of the cap 210. The two joining parts 204, 205 are linear zones parallel to one another placed at different heights on the side wall. The arched band 206 is raised from the side wall 12 except for the two joining parts 204 and 205. On two opposite sides of the arched band 206 two abutment side surfaces **216*a* and 216*b*** having a circular crown arc shape are identifiable.

A top region **216*d* of the arched band 206 that is most distant from the axis of the cap 201 bounds the overall dimensions of the protrusion 216** in a radial direction.

As in the case of cap 101, also in the cap 201 the function of the abutment side surfaces **216*a* and 216*b* is the same as the side faces 16*a* and 16*b* of the cap 10 of FIGS. 1 to 9. If the overall dimensions of the outer protrusion 216, defined by the abutment side surfaces 216*a* and 216*b* and by the top region 216*d* and by the upper joint 205 are contained in the seat defined by the orientation seat 74, then the cutting apparatus 1 can be used for making incisions also in the caps 210 with arc hinge 206**.

Alternatively, an embodiment of the cutting apparatus can be provided that is not shown, in which the spindle has an orientation seat or hollow housing shaped to house the outer protrusion 216. Similarly to the embodiments disclosed above, to which reference can be made without setting out the same considerations here, the hollow housing includes, in particular, an abutting surface or a plurality of abutting surfaces, arranged for abutting on one or more of the abutment side surfaces 216*a* or 216*b*. The hollow housing further includes a containing surface for containing above the upper joining part 205 and a front surface arranged for facing the top region 216*d*. Also in these embodiments, the hollow housing can have a plan shape substantially the same as a plan shape of the outer protrusion 216.

In all the cap embodiments examined above, the hollow housing will be suitably sized to house the envisaged protrusion.

The outer protrusions 116 and 216, if present, are alternative to one another. Each of which can be applied to a cap of snap type or also to a screw cap, as for example the caps in FIGS. 10 and 11. If the cap has the outer protrusions 116 or 216 and, in a diametric position opposite the protrusions 116 or 216 a protrusion of the tab type or an engaging portion for engaging with the fingers, like the protrusion 16 specified in FIGS. 9 and 9A, then in these cases, the cutting apparatus includes a spindle having more than one hollow housing, in particular two diametrically opposite hollow housing.

As it is possible to make incisions in defined angular positions of the cap with great precision and repeatability, the cutting apparatus according to the invention enables an incision to be obtained on a cap having a non-regular, non-axialsymmetric outer profile, in particular caps provided with an outer protrusion like a tab or a gripping portion and/or having an outer hinge, like for example the snap caps or caps provided with a hinge protruding from the side wall of the cap, whether a snap or a screw cap, the outer protrusion being used to phase the cap through the orientation seat of the spindle.

In fact, by phasing the cap angularly with the spindle by the orientation seat provided in the spindle, it is possible to avoid sliding of the cap on the spindle and thus avoid a loss of relative position between the cap and the cutting device. Owing to the invention, it is thus possible to reduce rejects in the production of caps provided with notches.

Further, providing an orientation seat in the spindle makes the cutting apparatus simpler than known cutting apparatuses that include a gripping arrangement provided with radially movable elements to retain the cap inside the gripping arrangement.

The cutting apparatus is further more versatile than known apparatuses because, after the dimensional limits of the orientation seat have been ascertained, it is possible to use the same spindle for caps having protrusions that are of different shapes from one another.

The invention claimed is:

1. A cutting apparatus for cutting a cap including a cup shape body having a base wall, a side wall and a protrusion projecting radially outward from the side wall of the cap externally of the cup shape body, comprising:

a spindle that is rotatable around a spindle axis along an advancement path which extends orthogonal to said spindle axis, said spindle being configured to rotate the cap around said spindle axis and advance the cap along the advancement path;

a support movable along said advancement path together with said spindle, said support being configured to retain the cap against said spindle;

a cutting device arranged to make a cut in the side wall of the cap when said spindle reaches a cutting zone of said advancement path, said spindle containing a cavity for at least partially receiving the cap and a hollow orientation seat having inner edge surfaces defining an enlarged portion of said cavity in an end region of said spindle that is closer to said support, wherein said inner edge surfaces have a size and shape configured to house the cap protrusion and to stop rotation of the cap in a preset position with respect to said spindle to orient the cap with respect to said cutting device, wherein said hollow orientation seat includes an abutting surface of the hollow orientation seat arranged for abutting a side face of the cap protrusion.

2. The cutting apparatus according to claim 1, wherein said abutting surface is not orthogonal to said axis.

3. The apparatus according to claim 1, wherein said hollow orientation seat further includes a first surface arranged for facing a first face of the cap protrusion normal to a side face of the cap protrusion, the cap protrusion first face having a portion extending circumferentially around the cap, said first surface being orthogonal to said spindle axis.

4. The cutting apparatus according to claim 1, wherein said hollow orientation seat further includes a second surface arranged for facing a second face of the cap protrusion, said second surface being more distant from said spindle axis than said first surface.

5. The cutting apparatus according to claim 1, wherein said hollow orientation seat has a planar shape corresponding with a planar shape of the cap protrusion.

6. The cutting apparatus according to claim 1, wherein said support is movable towards and away from said spindle and is drivable between a spaced position wherein said support is further from said spindle and a gripping position in which said support is nearer said spindle to retain said cap in the preset position.

7. The cutting apparatus according to claim 1, wherein said spindle includes a stop surface arranged for contacting an outer surface of the base wall, said stop surface being in contact with the outer surface of the base wall when the cap is retained between said support and said spindle.

8. The apparatus according to claim 7, wherein said stop surface includes a circular crown arc.

9. The cutting apparatus according to claim 7, and further comprising a gripping insert at least partially inserted into said cavity for contacting a portion of the cap that is distinct from the cap protrusion, said gripping insert being axially movable along said spindle axis between a work position in which said gripping insert is nearer a bottom region of said cavity and contacts the outer surface of the base wall, and a rest position in which said gripping insert is further from said cavity bottom region.

10. The apparatus according to claim 9, and further comprising an elastic element connected to said cavity bottom region and to said gripping insert and arranged for pressing said gripping insert against the outer surface of the base wall during operation.

11. The cutting apparatus according to claim 9, wherein said gripping insert when in the work position is so positioned that an end surface of said gripping insert intended to contact the outer surface of the base wall is at a same height as said stop surface and wherein said gripping insert when in the rest position is so positioned that said end surface is at a lower height than said stop surface.

12. The cutting apparatus according to claim 11, wherein said stop surface includes a circular crown are and said end surface has the shape of at least one circular crown arc having an outer diameter that is less than an inner diameter of said circular crown arc of said stop surface.

13. The cutting apparatus according to claim 1, wherein said support includes a contact surface arranged for contacting a peripheral portion of an inner surface of the base wall, the peripheral portion being arranged internally of the cup body near the cap side wall, said contact surface being in contact with the peripheral portion when said cap is retained between said support and said spindle.

14. The cutting apparatus according to claim 13, wherein said contact surface includes at least one peripheral circular crown arc of said support radially further from said spindle axis.

15. The cutting apparatus according to claim 13, wherein said support further includes a further cavity into which a further gripping insert is at least partially inserted that is configured to interact with an inner element of the cap, said inner element being arranged internally of the cup body and connected to the inner surface of the base wall, said further gripping insert being movable along an axis of said support between a further work position in which said further gripping insert is nearer a bottom wall of said further cavity and interacts with said inner element of the cap, and a further rest position in which said further gripping insert is further from the cap bottom wall.

16. The cutting apparatus according to claim 15, and further comprising a further elastic element connected with the cap bottom wall and with said further gripping insert and is arranged for pressing said further gripping insert against the cap inner element during operation.

17. The cutting apparatus according to claim 15, wherein said further gripping insert when in the further work position is so positioned that an end surface of said further gripping insert intended to contact the cap inner element is at a lower height of said contact surface and said further gripping insert when in the rest position is so positioned that said end surface is at a same height as said contact surface.

18. The cutting apparatus according to claim 17, wherein said contact surface has a circular crown shape having an inner diameter that is greater than an outer diameter of the peripheral circular crown are of said end surface.

19. The cutting apparatus according to claim 15, and further comprising a gripping insert at least partially inserted into said cavity for contacting a portion of the cap that is distinct from the protrusion, said gripping insert being axially movable along said spindle axis between a work position in which said gripping insert is nearer a bottom region of said cavity and contacts the outer surface of the base wall, and a rest position in which said gripping insert is further from said bottom region, and wherein when said spindle is in the work position said support is in the further work position to hold the cap in the preset position and when said spindle is in the rest position the support is in the further rest position.

20. The cutting apparatus according to claim 1, wherein said cutting device is fitted to said spindle, is rotatable with said spindle around said spindle axis and includes a oscillating arm around an oscillation axis that is not parallel to said axis, and wherein at least one blade is attached to one end of said oscillating arm for at least one of vertical and tilted cutting.

21. The cutting apparatus according to claim 20, wherein said oscillating arm is driven to oscillate by a cam profile on said oscillating arm configured to interact with a roller fitted to a fixed frame located in the cutting zone outside said spindle.

* * * * *